March 19, 1968  W. BUDDE  3,373,957
REMOTE VEHICLE CONTROL
Filed March 28, 1966
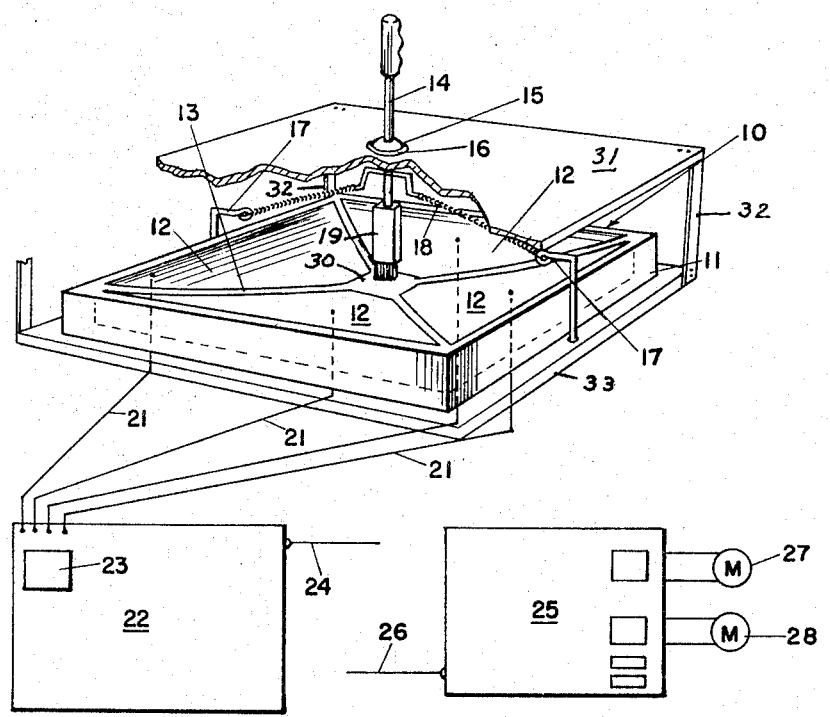
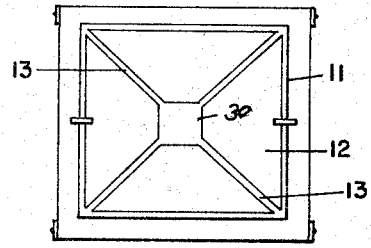
FIG. 3
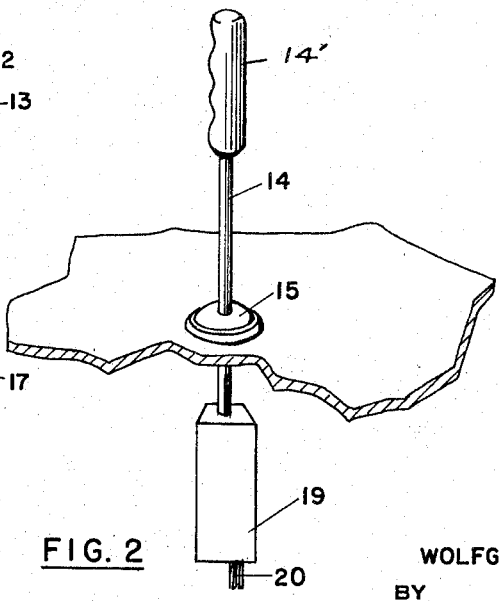
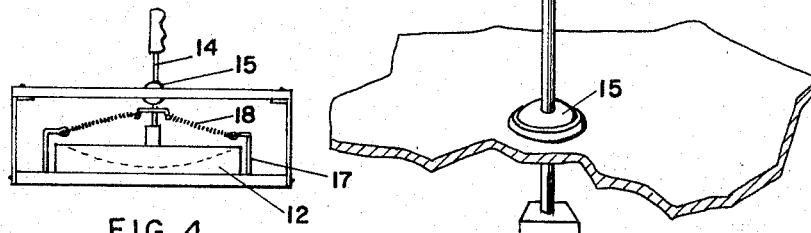
FIG. 4
FIG. 2
INVENTOR
WOLFGANG BUDDE
BY
Charles L. Lovercheck
attorney

United States Patent Office 3,373,957
Patented Mar. 19, 1968

3,373,957
REMOTE VEHICLE CONTROL
Wolfgang Budde, 758 E. 24th St., Erie, Pa. 16500
Filed Mar. 28, 1966, Ser. No. 537,724
5 Claims. (Cl. 244—75)

ABSTRACT OF THE DISCLOSURE

The present invention involves a control for model airplanes. The control is made up of a conventional receiver on the airplane, which transmits signals to the control surfaces of the airplane. The transmitter is a multi-tone or multi-channel transmitter and is controlled by signals from four sectors of a surface that conforms to a part of a sphere. A joy stick is supported above the surface with its center of rotation at the center of curvature of the sphere, and the operator can move the joy stick to move the contact thereof selectively over the several sectors and hereby control the flight of a model airplane. The control of the joy stick relative to the control surface is exactly the same relative to the airplane as a joy stick connected directly to the controls of a conventional airplane would be for corresponding maneuvers.

---

This invention relates to control systems and, more particularly, to a proportional control for two element control members on devices such as model airplanes and the like.

Radio controlled model airplanes have been provided with proportional type controls. All of these have had certain objections and are usually complex in construction and operation.

In the present invention, a proportional radio control is provided wherein a simple joy stick is connected to a control plate having four segments. The segments are engaged selectively by a motor having a cam supported brush whereby a desired proportion of rudder and elevator control on the airplane can be accomplished simply by movement of the joy stick in exactly the same manner in which it would be moved if mounted on an aircraft.

It is, accordingly, an object of the present invention to provide an improved radio control member for model airplanes.

Another object of the invention is to provide an improved control member.

Yet another object of the invention is to provide a control member in combination with a ratio transmitter which is simple in construction, economical to manufacture, and simple and efficient to use.

A further object of the invention is to provide an improved combination radio control, transmitter, and radio receiver mounted on an airplane.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an isometric view of a control member according to the invention along with a schematic view of a radio transmitter and radio receiver indicated as mounted on a model airplane; and FIG. 2 is an enlarged view of the joy stick shown in FIG. 1 with motor and cam mounted thereon;

FIG. 3 is a top view of the support; and

FIG. 4 is an enlarged broken view of part of the control.

Now with more particular reference to the drawing, the control member has a support 10 which may be mounted on a convenient arrangement, for example, mounted in a carrying case, along with the radio transmitter 22. The support has a frame 11 made of insulating material which supports the four segments 12 which are made of an electrical conducting material having the insulation material 13 separating the segments 12 from each other and disposed in four radiating lines radiating from the central part indicated in FIG. 1. The central rectangular area 30 is made of insulation. The top surface of the segments 12 and the top surface of insulation material 13 are shaped to conform to the surface of a smooth sphere having a radius with center of curvature at the center of ball member 15. The ball member 15 is fixed to the joy stick 14 is received in a socket indicated at 16 that is carried by the top 31 which is supported by the struts 32 in turn supported on the frame 11. The joy stick is urged to a central position by springs 18 which are connected to eye bolts 17 at their lower ends and to the joy stick 14 at their upper ends.

The motor 19 has a brush 20 mounted on its shaft which is rotated by the motor. The brush is mounted eccentric to the center of the motor shaft. Thus, the brush is moved in a circular path which may extend partly on to one segment 12 and partly on to another segment 12 when the joy stick 14 is moved adjacent a line of insulation material 13. The joy stick has a handle 14' on the upper end thereof as indicated which may be grasped by the hand of the operator to move the joy stick about as desired.

The segments 12 are connected to the several input points of a radio transmitter 22 through lines 21. The transmitter 22 may be of a multi-tone or multi-channel type with separate channels 23. The transmitting antenna 24 on the transmitter will transmit signals to an aircraft indicated at 25 having an antenna 26 on it. The elevator of the airplane will be driven by the motor 27, for example, and the rudder will be driven by the motor 28, for example. Thus, the elevator motor will, for example, be driven only when the brush 20 engages either of the two nonadjacent segments 12. The rudder will be driven when the handle 14' is moved at ninety degrees to the first mentioned direction so that the brush will be solely in engagement with the other two non-adjacent segments between the first mentioned two non-adjacent segments. When the brush rests on the central rectangular area of insulation material, it is inactive since it is connected to no radio transmitter channel.

If the handle 14' is not moved straight ahead but is moved at a forty-five degree angle, for example, then one of the rudder segments 12 as well as one of the elevator segments 12 would each be engaged half of the time by brush 20. Thus, by movig the handle on joy stick 14 in a proper manner, the airplane can be controlled to climb smoothly or to turn smoothly or to make climbing or descending turn through the radio control provided. The motor 19 makes the transition from one control function to the other smooth.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A control comprising
   a support member,
   said support member having a surface thereon formed in the shape of a part of the surface of a sphere, said surface having a central rectangular part made of insulation material and four lines of insulation material radiating from said central insulation material.

said lines defining segments of material between said lines of insulation material, said segments being made of electrical conductive material, a joy stick, bearing means supporting said joy stick on said support member at a distance therefrom equal to the radius of curvature of said spherical surface, a brush member on the end of said joy stick adjacent said surface, said brush member selectively engaging each of said surfaces of said sections when said joy stick is moved to predetermined positions, a radio transmitter having at least four channels, and means connecting each said control segment to a said channel, said joy stick having a handle on the end thereof remote from said brush member whereby said brush member can be moved to a plurality of positions relative to said control segments, and means completing the circuit to said segments and said radio transmitter.

2. The control recited in claim 1 wherein said control is provided in combination with a radio receiver, said radio receiver having at least four channels, including a first channel, a second channel, and a third channel, said first channel being electrically connected to one said segment and said second channel being connected to a said segment adjacent to the first mentioned segment.

3. The control recited in claim 1 wherein said radio transmitter has an antenna thereon, and an aircraft having a multi-channel radio receiver mounted thereon in combination therewith, said aircraft having a first motor connected to its rudder and a second motor connected to its elevator, one said channel being connected to actuate said first motor and another channel being connected to actuate said second motor.

4. A control comprising a support member, said support member having a surface thereon formed in the shape of a part of the surface of a sphere, said surface having a central rectangular part made of insulation material and four lines of insulation material radiating from said central insulation material, said lines defining segments of material between said lines of insulation material, said segments being made of electrical conductive material, a joy stick, bearing means supporting said joy stick on said support member at a distance therefrom equal to the radius of curvature of said spherical surface, a brush member on the end of said joy stick adjacent said surface, said brush member selectively engaging each of said surfaces of said sections when said joy stick is moved to predetermined positions, a radio transmitter having at least four channels, and means connecting each said control segment to a said channel, said joy stick having a handle on the end thereof remote from said brush member whereby said brush member can be moved to a plurality of positions relative to said control segments, and means completing the circuit to said segments and said radio transmitter, said brush being mounted on the shaft of a motor said motor being adapted to run continuously, said brush being disposed eccentric from the center of rotation of said motor shaft.

5. A control comprising a support member, said support member having a surface thereon formed in the shape of a part of the surface of a sphere, said surface having a central rectangular part made of insulation material and four lines of insulation material radiating from said central insulation material, said lines defining segments of material between said lines of insulation material, said segments being made of electrical conductive material, a joy stick, bearing means supporting said joy stick on said support member at a distance therefrom equal to the radius of curvature of said spherical surface, a brush member on the end of said joy stick adjacent said surface, said brush member selectively engaging each of said surfaces of said sections when said joy stick is moved to predetermined positions, a radio transmitter having at least four channels, and means connecting each said control segment to a said channel, said joy stick having a handle on the end thereof remote from said brush member whereby said brush member can be moved to a plurality of positions relative to said control segments, and means completing the circuit to said segments and said radio transmitter, said brush being mounted on said joy stick by means of a motor, said motor being adapted to run continuously, said brush being connected to the shaft of said motor eccentric from the center thereof whereby said brush is moved over two of said segments when said joy stick is in a position adjacent any of said lines.

References Cited
UNITED STATES PATENTS

| | | | |
|---|---|---|---|
| 1,532,939 | 4/1925 | Peple | 244—77 |
| 2,165,800 | 7/1939 | Koch | 244—77 |
| 3,020,457 | 2/1962 | Kelly | 318—16 |

FERGUS S. MIDDLETON, *Primary Examiner*.